(12) United States Patent
Park et al.

(10) Patent No.: US 7,843,775 B2
(45) Date of Patent: Nov. 30, 2010

(54) OPTICAL DISC APPARATUS AND FOCUSING METHOD FOR THE SAME

(75) Inventors: Sang Yeal Park, Suwon-si (KR); Kab Kyun Jeong, Yongin-si (KR); Kwan Joon Kim, Hwasung-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 856 days.

(21) Appl. No.: 11/734,472

(22) Filed: Apr. 12, 2007

(65) Prior Publication Data
US 2008/0043581 A1 Feb. 21, 2008

(30) Foreign Application Priority Data
Jun. 30, 2006 (KR) .............. 10-2006-0060995

(51) Int. Cl.
*G11B 7/00* (2006.01)
(52) U.S. Cl. ........... 369/44.25; 369/44.29; 369/44.34
(58) Field of Classification Search ... 369/44.25–44.36, 369/94, 44.23, 112.23, 112.08, 112.25
See application file for complete search history.

(56) References Cited

U.S. PATENT DOCUMENTS

| | | | | |
|---|---|---|---|---|
| 4,542,491 A | * | 9/1985 | Takasago et al. | 369/44.29 |
| 5,060,215 A | * | 10/1991 | Kawamura et al. | 369/44.35 |
| 5,086,420 A | * | 2/1992 | Doi | 369/44.25 |
| 5,363,357 A | * | 11/1994 | Niwayama | 369/44.35 |
| 5,675,569 A | * | 10/1997 | Yamaguchi et al. | 341/94 |
| 5,757,745 A | * | 5/1998 | Takeya | 369/44.27 |
| 5,903,530 A | * | 5/1999 | Tateishi et al. | 369/44.29 |
| 6,240,054 B1 | * | 5/2001 | Takeya et al. | 369/44.29 |
| 6,487,153 B2 | * | 11/2002 | Kamiyama et al. | 369/44.27 |
| 6,628,580 B1 | * | 9/2003 | Kishimoto et al. | 369/44.28 |

FOREIGN PATENT DOCUMENTS

JP 2003-051127 2/2003

* cited by examiner

*Primary Examiner*—Thang V Tran
(74) *Attorney, Agent, or Firm*—Stanzione & Kim, LLP

(57) ABSTRACT

An optical disc apparatus and a focusing method for the same prevent a focusing start error of an optical pickup when using a ring-shaped lens to handle multiple wavelengths, and allow the optical pickup to start focusing at the correct starting time. To write and/or read data to and/or from an optical disc, an optical pickup in the optical disc apparatus emits a laser beam to the disc through an objective lens, and reads a reflected beam to output a read signal. The optical pickup outputs a signal based on the read reflected beam. An actuator controls the position of the objective lens so that the laser beam is focused on a surface of the disc. A focusing controller performs focusing operations on the actuator using a focus error signal generated from the signal outputted from the optical pickup. A focusing start time detector processes the read signal used to generate the focus error signal and detects when to start the focusing control of the focusing controller.

21 Claims, 7 Drawing Sheets

OPTICAL DISC APPARATUS AND FOCUSING METHOD FOR THE SAME

CROSS-REFERENCE TO RELATED APPLICATIONS

This application claims the benefit of Korean Application No. 2006-60995, filed Jun. 30, 2006, in the Korean Intellectual Property Office, the disclosure of which is incorporated herein by reference.

BACKGROUND OF THE INVENTION

1. Field of the Invention

Aspects of the present invention relate to an optical disc apparatus and a focusing method for the optical disc apparatus, and more particularly, to an optical disc apparatus and a focusing method for the optical disc apparatus which efficiently prevent a focusing start error of an optical pickup when using a ring-shaped lens to handle multiple wavelengths and allow the optical pickup to start focusing correctly.

2. Description of the Related Art

Generally, an optical disc apparatus emits a laser beam to an optical disc to write data onto the optical disc, or reads a laser beam reflected from the optical disc containing data recorded onto the optical disc.

The laser wavelength and the numerical aperture (NA) of the optical disc apparatus are adjusted depending on the storage capacity of the optical disc apparatus. An infrared laser beam having a wavelength of about 70 nanometers (nm) and an objective lens having a numerical aperture of about 0.4 are used to read data from and write data onto compact discs (CDs). A red laser beam having a wavelength in the range of 635-650 nm and an objective lens having a numerical aperture of about 0.6 are used to read data from and write data onto digital versatile discs (DVDs).

A blue laser beam having a wavelength of about 405 nm, which is a shorter wavelength than the wavelength of the laser beam used to read data from and write data onto DVDs, is used to read data from and write data onto Blu-ray Discs (BD).

As the wavelength of the laser beam used to write data onto and read data from an optical disc becomes smaller, the track pitch of the optical disc may be correspondingly reduced so that a larger amount of data may be stored onto an optical disc of the same size.

DVD writer/reader units are generally designed to be compatible with CD writer/reader units, so that the DVD writer/reader units can write and/or read data to and/or from not only DVDs, but also CDs. DVD writer/reader units which handle multiple wavelengths are divided into two types: DVD writer/reader units which use a plurality of lenses corresponding to multiple wavelengths, and DVD writer/reader units which use only a single lens designed to handle multiple wavelengths. The DVD writer/reader units which use only a single lens are easy to design and cost less to manufacture than the DVD writer/reader units which use multiple lenses, and are therefore more commonly used today.

When writing and/or reading data to and/or from an optical disc, it is necessary to accurately focus a laser beam onto a recording layer of the optical disc. To accurately focus a laser beam onto a recording layer of the optical disc, a plurality of divided signals is generated from a laser beam reflected by the optical disc, and a focus error signal is in turn generated from the plurality of divided signals. An optical disc apparatus generally includes an objective lens, an actuator used to control the focus of the laser beam which writes and reads data to and from an optical disc, and a focus controller used to control the actuator. The focus controller in the optical disc apparatus typically controls the actuator using a focus error signal which enables the focus controller to keep the actuator continuously positioned so that the actuator accurately follows a recording layer of an optical disc.

When a user inserts an optical disc into an optical disc apparatus and issues a write or read command, the optical disc apparatus performs a focus search operation to obtain a focus error signal. The focus error signal enables the focus controller to commence a focus control operation, using the focus error signal to ensure that the focus of the laser beam continuously follows the recording layer of the optical disc. Specifically, the focus search operation detects a zero crossing point (ZCP) of the focus error signal while moving the objective lens vertically above the surface of the optical disc. Once the focus search operation detects the ZCP, the focus control operation is started based on the detected ZCP.

As illustrated in FIG. 7, when multiple wavelengths are handled using a single lens 22 to write and/or read data to and/or from various types of optical discs, the single lens 22 is generally designed to be a ring-shaped lens having a surface with multiple diffraction rings 22a and 22b corresponding respectively to the multiple wavelengths. However, when this ring-shaped lens 22 having a surface with multiple diffraction rings 22a and 22b is used during the focus search operation, the ring-shaped lens causes an abnormal parasitic signal, as shown in FIG. 1.

The parasitic signal or external noise may cause the focus search operation to incorrectly detect the parasitic signal or external noise as the ZCP of the focus error signal, resulting in incorrect focusing of the objective lens on the recording layer, or resulting in failure to start the focusing control operation.

The conventional focusing method, in which the focusing control operation is based on the amplitude of the focus error signal, cannot prevent the incorrect focusing of the objective lens onto the recording layer of the optical disc, or prevent a failure of the focusing control operation from starting, when the amplitude of the parasitic signal or noise is high enough that the focusing control operation incorrectly detects the parasitic signal or external noise as the ZCP.

SUMMARY OF THE INVENTION

Therefore, it is an aspect of the present invention to provide an optical disc apparatus and a focusing method for the same, wherein a signal read from an optical disc is appropriately processed to detect when to start a focusing control operation so that the focusing control operation is started using the detected focusing start time.

Additional aspects and/or advantages of the invention will be set forth in part in the description which follows and, in part, will be obvious from the description, or may be learned by practice of the invention.

In accordance with an aspect of the invention, an optical disc apparatus includes an optical pickup which emits a laser beam through an objective lens to an optical disc, reads data from the optical disc included in the laser beam reflected from the optical disc, and then outputs a signal based on the reflected laser beam along a signal path, a focusing start time detector which generates a focus error signal from the signal outputted by an optical pickup, a focusing controller which uses the focus error signal to begin focusing operations, and an actuator controlled by the focusing controller and which adjusts the objective lens to focus the laser beam onto a recording layer of the optical disc.

Preferably, although not necessarily, the optical pickup reads the reflected beam and outputs a plurality of divided signals, wherein the focusing start time detector includes a summation circuit which sums together at least two of the divided signals to generate a summed signal.

Preferably, although not necessarily, the focusing start time detector further includes a high pass filter (HPF) located after the summation circuit along the signal path, wherein the summed signal is transmitted from the optical pickup to the HPF.

Preferably, although not necessarily, the focusing start time detector further includes a low pass filter (LPF) located between the summation circuit and the HPF along the signal path.

Preferably, although not necessarily, the optical disc apparatus further includes a gate or window signal generator which generates a gate or window signal, respectively, based on a signal outputted from the focusing start time detector, wherein the focusing controller starts the focusing operation using the generated gate or window signal.

Preferably, although not necessarily, the objective lens is a ring-shaped lens which focuses laser beams having different wavelengths.

In accordance with another aspect of the invention, an optical disc focusing method includes emitting a laser beam to an optical disc through an objective lens in order to write and/or read data to and/or from the optical disc and to read a beam reflected from the optical disc to output a plurality of divided signals, summing one or more of the divided signals together and outputting a summed signal, and determining whether to start focusing the laser beam onto a specific layer of the optical disc based on the outputted summed signal.

Preferably, although not necessarily, the objective lens is a ring-shaped lens which focuses multiple wavelengths.

Preferably, although not necessarily, determining whether to start the focusing control process includes processing the outputted summed signal to generate a gate or window signal, wherein the focusing control process is started based on the generated gate or window signal.

Preferably, although not necessarily, determining whether or not to start the focusing control process includes transmitting the outputted summed signal through a high pass filter (HPF) which transmits signals at frequencies higher than a first predetermined frequency, and determining whether to start the focusing control process using the outputted summed signal that has passed through the HPF.

Preferably, although not necessarily, before the outputted summed signal is transmitted through the HPF, the outputted summed signal is transmitted through a low pass filter (LPF) which is located between the summation circuit and the HPF along the signal path.

Preferably, although not necessarily, the gate or window signal is generated using the outputted summed signal transmitted through the high pass filter (HPF).

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
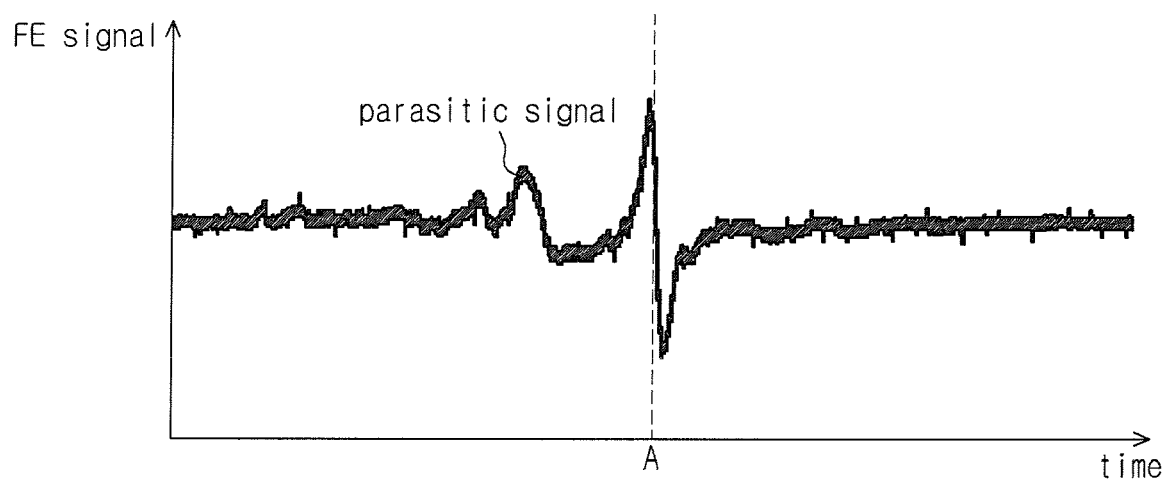
FIG. 1 is a graph showing a focus error signal of an optical disc apparatus which uses a ring-shaped lens to handle multiple wavelengths.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
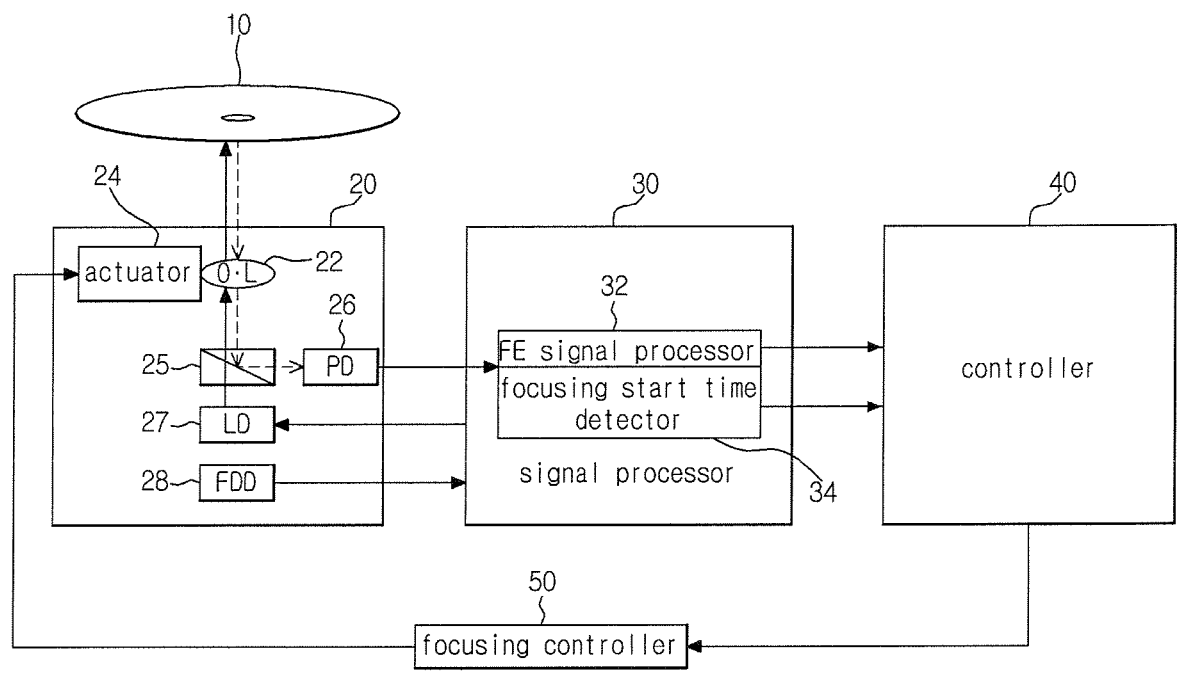
FIG. 2 is a schematic block diagram of an optical disc apparatus according to an embodiment of the present invention.

FIG. 2 is a schematic block diagram of an optical disc apparatus according to an embodiment of the present invention. The optical disc apparatus of FIG. 2 includes an optical pickup 20, a signal processor 30, a controller 40, and a focusing controller 50. The optical pickup 20 emits a laser beam onto an optical disc 10, reads the reflected beam, and then outputs a signal, based on the reflected beam, along a signal path. The signal processor 30 processes the signal read from the optical pickup 20 and processes signals from a laser diode 27 and a front photodiode 28 included in the optical pickup 20. The controller 40 controls overall operations of the optical disc apparatus. The focusing controller 50 controls the focus of the laser beam which is emitted onto the optical disc 10.

The optical pickup 20 includes an objective lens 22, a beam splitter 25, a photodiode (PD) 26, a laser diode (LD) 27, and a front photodiode (FPD) 28. The LD 27 emits a laser beam. The objective lens 22 focuses the emitted laser beam onto a recording layer of the optical disc 10. The PD 26 receives laser beams reflected from the optical disc 10 and outputs signals corresponding to the received laser beams to a signal processor 30. The FPD 28 receives part of the laser beam emitted from the LD 27 and checks the power of the emitted laser beam. The beam splitter 25 controls the path of the laser beam and splits a portion of the laser beam reflected from the optical disc 10 towards the PD 26. The PD 26 is divided into several sections and outputs signals corresponding to the amplitudes of luminance of reflected beams received by the corresponding sections. The PD 26 outputs the divided signals, which are referred to as signals A, B, C, D, E, and F, in order to perform a focusing control operation which accurately focuses the laser beam onto a specific recording layer of the optical disc 10 during the process of writing data onto and/or reading data from the optical disc 10. The divided signals of the beams reflected from the optical disc 10 are also used to perform tracking controls which allow the optical disc apparatus to follow a specific track of a specific recording layer of the optical disc 10.

The signal processor 30 processes signals outputted from the optical pickup 20 and generates a focus error (FE) signal based on these processed signals. In an embodiment of the present invention, the focus error signal is generated using the formula:

"(A+C)−(B+D)", where "A," "B," "C," and "D" denote the respective amplitudes of divided signals A, B, C, and D. If a laser beam is not accurately focused on the correct recording layer of the optical disc 10, the luminance of the beam reflected by the optical disc 10 is generally low, which correspondingly causes the amplitude of the signal outputted from the PD 26 to be low as well. Accordingly, when noise or some other type of interference abnormally changes the focus error signal, the total amplitude of signals outputted from the PD 26 is a much lower total amplitude than the total amplitude of signals outputted from the PD 26 when the beam is accurately focused on the recording layer. In other words, the amplitude of the sum of all or some of the read signals when the laser beam is not accurately focused onto the recording layer of the optical disc 10 is a lower amplitude than the amplitude of the sum of all or some of the read signals when the laser beam is accurately focused onto the recording layer of the optical disc 10. It is understood that formulas other than the formula above may be used to calculate the focus error signal.

In some instances when the beam is focused abnormally onto the recording layer of the optical disc 10, the amplitude of the sum of a few of the divided signals may be similar to the amplitude when the beam is accurately focused onto the recording layer of the optical disc 10. However, this situation is unusual, and in any event, the amplitude of the sum of other divided signals will be a lower amplitude than the amplitude when the beam is accurately focused onto the recording layer of the optical disc 10.

In order to detect the correct time when to start the focusing control operation, the optical disc apparatus according to an aspect of the present invention processes the signals transmitted from the PD 26. When the beam is accurately focused onto a specific recording layer of the optical disc 10, the total amplitude of signals transmitted from the PD 26 is higher than the total amplitude of signals transmitted from the PD 26 when noise or a parasitic signal occurs. The optical disc apparatus sums together all or some (for example, A+B+C+D) of the divided signals A, B, C, D, E, and F, and then uses the amplitude of this summed signal to detect the appropriate time to start focusing the laser beam onto the optical disc 10. Since each of the divided signals has a small amplitude and each of the divided signals is greatly affected by noise or a parasitic signal which occur when a ring-shaped lens is used, it is preferable to base the calculation of the focusing start time on all or at least a few of the divided signals, instead of just one divided signal.

A signal outputted from the focusing start time detector 34 included in the signal processor 30 is transferred to the controller 40. Then, the controller 40 transmits a command to the focusing controller 50 to start a focusing control operation. After the controller 40 transmits the start command to the focusing controller 50, the focusing controller 50 controls the actuator 24 to follow the recording layer of the optical disc 10 according to a focus error signal generated by an FE signal processor 32 included in the signal processor 30. The term "focusing control operation" refers to a process of controlling the actuator 24 with feedback in order to continuously keep the objective lens 22 at the proper distance from the recording layer of the optical disc 10.

Figure 3:
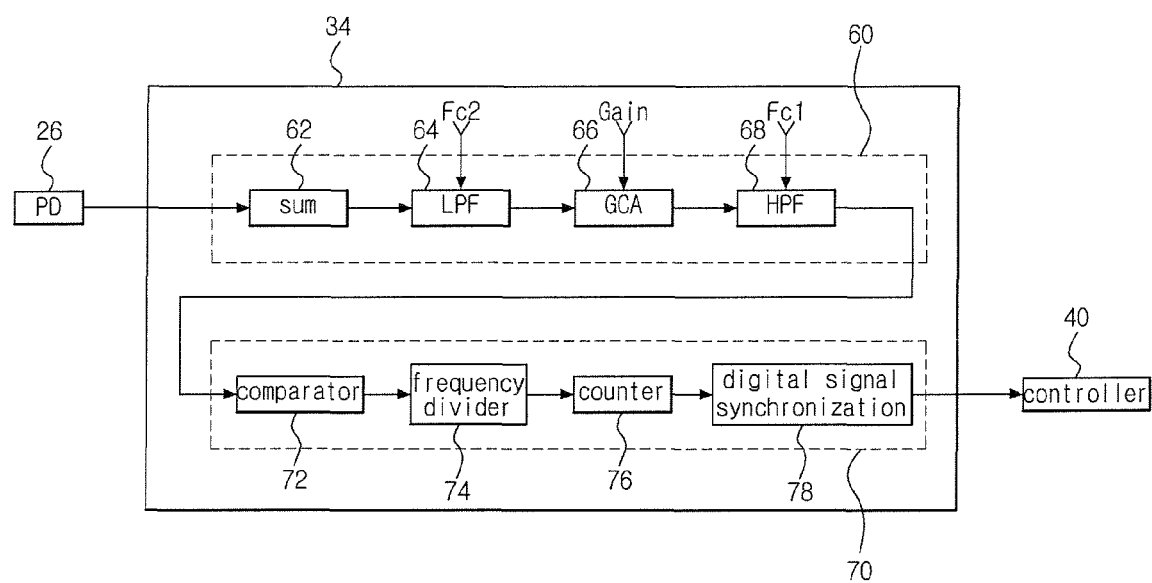
FIG. 3 is a block diagram of the focusing start time detector shown in FIG. 2.

FIG. 3 is a block diagram of a focusing start time detector according to an embodiment of the present invention.

The focusing start time detector 34 is divided into a summation circuit block 60, which sums detected signals of the PD 26 and outputs the summed signal after noise filtering and appropriate amplification, and a gate signal generation block 70 which receives the summed signal from the summation circuit block 60 and then outputs a gate or window signal based on the received summed signal outputted from the summation circuit block 60. The summation circuit block 60 includes a summation circuit 62, a low pass filter (LPF) 64, a gain control amplifier 66, and a high pass filter (HPF) 68. The gate signal generation block 70 includes a comparator 72, a frequency divider 74, a counter 76, and a digital signal synchronization block 78. The summation circuit 62 receives signals from the PD 26 and sums all or some of the received signals received from the PD 26. The LPF 64 transmits summed signals having frequencies less than a predetermined frequency (Fc2), and blocks the summed signals having frequencies higher than Fc2. The gain control amplifier 66 controls the gain of a summed signal after the summed signal passes through the LPF 64. Since the frequency of noise included in the signals received by the summation circuit block 60 is generally high, a significant portion of the noise is removed through this noise filtering process. It is understood that the summation circuit block 60 and gate signal generation block 70 are not limited to the configurations of the embodiment illustrated in FIG. 3. Additionally, it is understood that the number of filters used in the summation circuit block 60 and gate signal generation block 70 may be varied.

After a summed signal passes through the gain control amplifier 66, the summed signal is inputted to the HPF 68 which transmits summed signals at frequencies higher than a predetermined frequency (Fc1) and blocks the remaining summed signals at frequencies lower than Fc1. The signal path is the path which the signals travel along indicated by the direction of the arrows shown in FIG. 3. Since the amplitude of signals outputted from the PD 26 when a parasitic signal or noise occurs is low, the amplitude of signals outputted from the PD 26 when a parasitic signal or noise occurs closely resembles a DC amplitude. Accordingly, the HPF 68 filters out noise and a parasitic signal, and detects and outputs a normal focus error signal.

The normal focus error signal transmitted through the HPF 68 is then inputted to the gate signal generation block 70 to generate a gate or window signal. The gate or window signal enables the controller 40 and the focusing controller 50 to easily determine the correct time when to start focusing the laser beam onto the recording layer of the optical disc 10.

Figure 4:
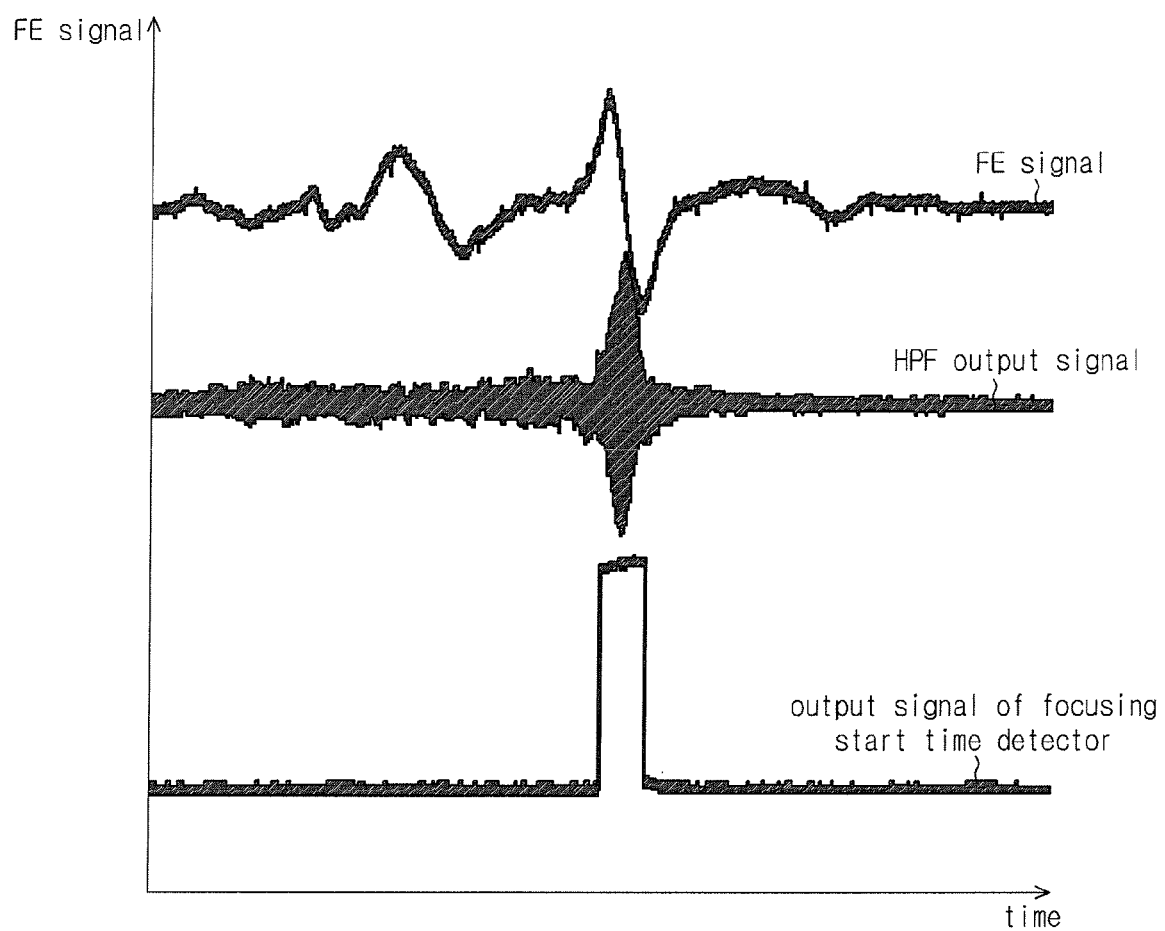
FIG. 4 is a graph showing a focusing start time detection signal which the focusing start time detector of FIG. 3 outputs based on a signal read by an optical pickup.

A description of how a gate or window signal is generated will now be given with reference to FIGS. 4 and 5. As described above, the HPF 68 filters out a parasitic signal, which is included in the front portion of an FE signal, and then the HPF 68 transmits a normal FE signal. This HPF output signal is then used to generate a gate or window signal through the procedure shown in FIG. 5.

Figure 5:
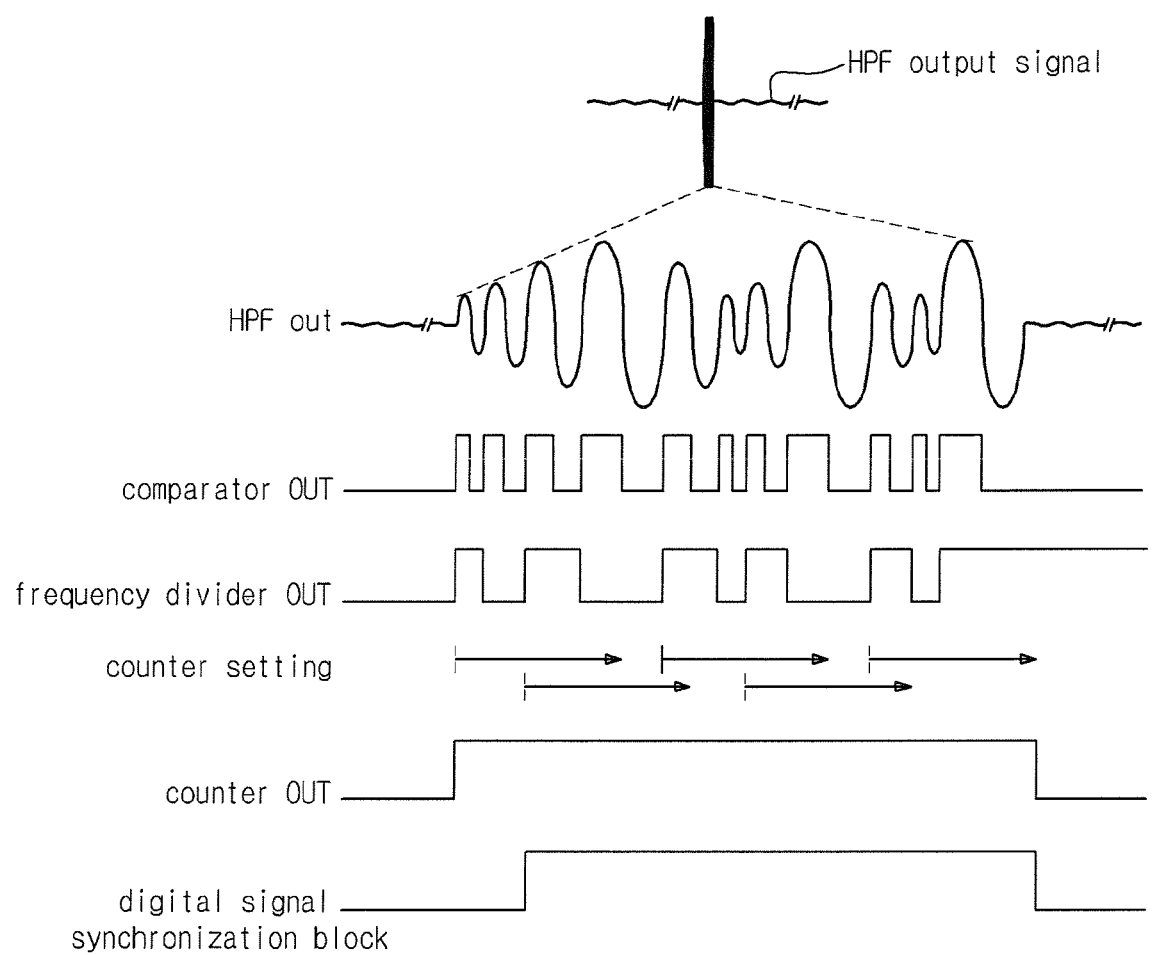
FIG. 5 is a signal diagram showing how a gate or window signal is generated using a high pass filter (HPF) in the focusing start time detector shown in FIG. 3.

When the HPF output signal is magnified as shown in FIG. 5, it can be seen that the magnified HPF output signal is a high frequency signal, represented by the "HPF OUT" signal. The comparator 72 receives and compares this HPF output signal with a reference voltage and outputs a digital signal matching the frequency of the HPF output signal, represented by the "comparator OUT" signal. Since processing the relatively high frequency of the digital signal is difficult, the frequency divider 74 reduces the high frequency of the digital signal outputted from the comparator 72 by half, represented by the "frequency divider OUT" signal. At the rising edges of the signal outputted from the frequency divider 74, the counter 76 starts counting a predetermined period of time, represented by the "counter setting" arrows. The counter 76 restarts the counting when a next rising edge of the "frequency divider OUT" signal occurs within this predetermined period of time. During the length of time when the counter 76 counts, the counter 76 outputs a predetermined signal. The predetermined signal outputted from the counter 76 is represented by the "counter OUT" signal shown in FIG. 5. Finally, the digital signal synchronization block synchronizes digital signals of the optical disc apparatus. Through the above-described procedure, the signal which passes through the HPF 68 is inputted as a gate or window signal to the controller 40, and the controller 40 then uses the gate or window signal to control the focusing controller 50. The controller 40 uses the gate or window signal to start the focusing controller operation of the focusing controller 50 at the correct time, properly focusing the objective lens 22 at the correct time.

Figure 6:
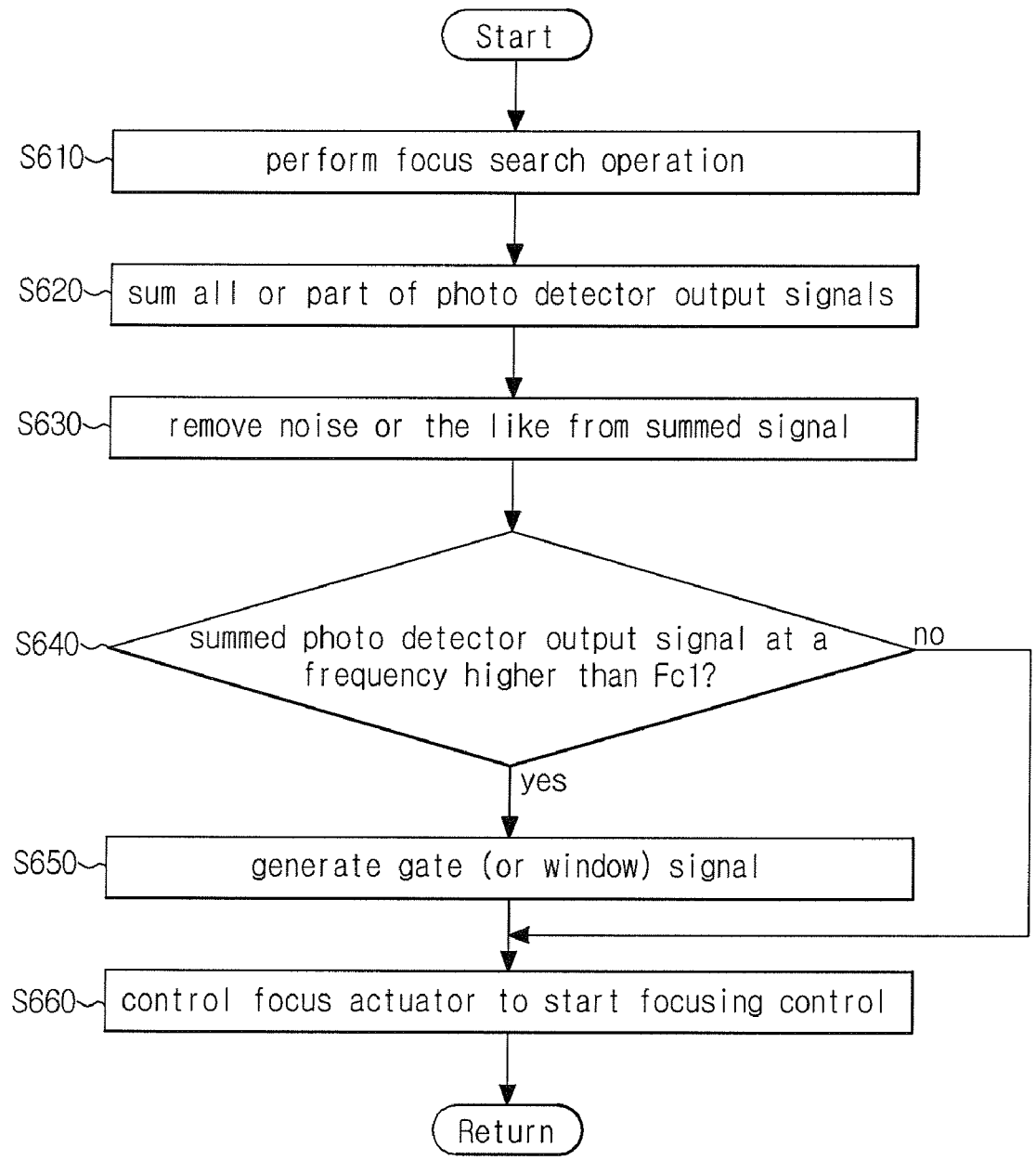
FIG. 6 is a flow chart of a focusing method illustrating how to focus an optical disc apparatus according to another embodiment of the present invention.
Figure 7:
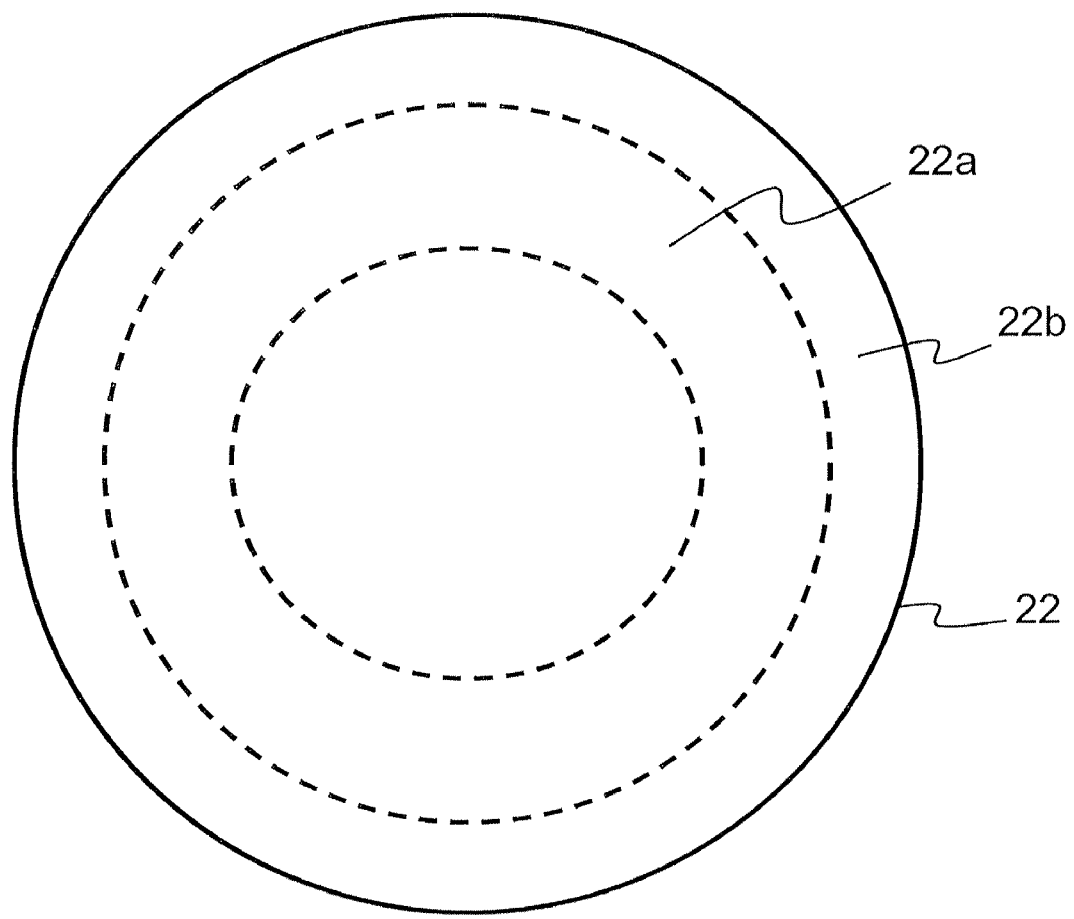
FIG. 7 illustrates an objective lens including rings having different diffraction characteristics.

FIG. 6 is a flow chart of a focusing method illustrating how to focus an objective lens used with an optical disc apparatus, according to another embodiment of the present invention. When a user inserts the optical disc 10 into an optical disc apparatus, the optical disc apparatus performs a focus search operation in order to focus a beam emitted by the optical pickup 20 onto a recording layer of the optical disc 10 (S610). The focus search operation may be performed while moving the objective lens 22 toward or away from the optical disc 10. However, since a modern objective lens 22 typically has a high numerical aperture in order to focus light with low wavelengths onto high capacity optical discs, such as DVDs and BDs, there is a risk that the modern objective lens 22 may collide with the optical disc 10 if the focus search operation is performed while moving the objective lens 22 toward the optical disc 10. Accordingly, the focus search operation is generally performed while moving the objective lens away from the optical disc 10.

When the objective lens is moved away from the optical disc 10, the optical disc 10 reflects a parasitic signal before reflecting a normal focus error signal, affecting the accuracy of the error signal and in turn creating a high probability that a laser beam transmitted by an optical pickup may incorrectly focus onto the recording layer of the optical disc 10. Additionally, affecting the accuracy of the error signal creates a chance that the optical pickup will not start focusing at all. All or some of the divided signals transmitted by the PD 26 are summed together while performing the focus search operation (S620). The summed signal is then passed through the LPF 62 to filter out noise included in the summed signal (S630). The summed signal, which corresponds to the output signal transmitted by the PD 26, is then inputted to the HPF 68, which transmits signal with a higher frequency than a predetermined frequency Fc1 (S640). When the signal has a frequency higher than Fc1, the signal is transmitted through the HPF 68 to the gate or window signal generation block 70 where the transmitted signal is used to generate a gate or window signal (S650). The actuator 24 then uses the gate or window signal to start a focusing control operation (S660).

The optical disc apparatus and focusing method for the optical disc apparatus as described above create a variety of advantages. For instance, the optical disc apparatus and focusing method ensure that focusing operations of a laser beam start at the correct time by filtering out parasitic signals and/or noise.

Aspects of the present invention also make it possible to start focusing a laser beam onto an optical disc at the correct time, regardless of the amplitude of a parasitic signal or noise.

Additionally, aspects of the present invention ensure that an optical disc apparatus which uses a single lens to handle multiple wavelengths starts focusing operations in a correct and reliable fashion each time data is written onto or read from an optical disc.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical disc apparatus, comprising:
   an optical pickup which emits a laser beam through an objective lens to an optical disc, wherein the optical pickup reads the laser beam reflected from the optical disc and then outputs a plurality of signals based on the reflected laser beam along a signal path;
   a focusing start time detector which generates a gate or digital window signal based on the plurality of signals output by the optical pickup;
   a focus error signal processor to generate a focus error signal corresponding to a magnitude of the amplitudes of the plurality of signals output by the optical pickup;
   a focusing controller which uses the focus error signal to begin a focusing operation at a time indicated by the gate or window signal; and
   an actuator controlled by the focusing controller to adjust the objective lens to focus the laser beam onto a recording layer of the optical disc,
   wherein the focusing start time detector comprises:
   a comparator to output a digital signal based on the plurality of signals from the optical pickup,
   a counter to begin a count at each rising edge of the digital signal output by the comparator, and
   a digital signal synchronization circuit to output a digital signal having an asserted level while the counter is counting arid having a non-asserted level when the counter is not counting.

2. The optical disc apparatus according to claim 1, wherein the focusing start time detector comprises a summation circuit which sums together at least two of the plurality of signals output by the optical pickup to generate a summed signal, and
   the comparator outputs the digital signal based on the summed signal.

3. The optical disc apparatus according to claim 2, wherein the plurality of signals comprises four signals, wherein each signal has a corresponding amplitude of either A, B, C, or D, and
   wherein the summation circuit generates a focus error signal according to the equation:

focus error=$(A+C)-(B+D)$.

4. The optical disc apparatus according to claim 2, wherein the focusing start time detector further comprises a high pass filter (HPF) located after the summation circuit along the signal path to filter out signals having frequencies less than a predetermine zero crossing point value of the optical disc, and
   wherein the summed signal is transmitted from the summation circuit to the HPF.

5. The optical disc apparatus according to claim 4, wherein the focusing start time detector further comprises a low pass filter (LPF) located between the summation circuit and the HPF along the signal path.

6. The optical disc apparatus according to claim 2, further comprising the gate or window signal generator to generate a gate signal based on the summed signal,
   wherein the focusing controller starts the focusing control using the generated gate or window signal.

7. The optical disc apparatus according to claim 1, wherein the objective lens comprises a ring-shaped lens which focuses laser beams having different wavelengths.

8. The optical disc apparatus according to claim 7, wherein the objective lens further comprises a surface with a plurality of diffraction rings which focuses the laser beams having different wavelengths onto corresponding optical discs.

9. The optical disc apparatus according to claim 8, wherein the corresponding optical discs comprise at least two of a blue-ray disc, a high-density digital versatile disc, a digital versatile disc, and a compact disc.

10. An optical disc focusing method, comprising:
emitting a laser beam through an objective lens to an optical disc to write data onto and/or read data from the optical disc;
reading the laser beam reflected from the optical disc;
outputting a plurality of signals based on the reflected laser beam;
summing at least some of the divided signals together and outputting a summed signal;
generating a digital signal based on the summed signal;
initiating a counter at each rising edge of the summed signal;
generating a gate or window signal having an asserted state when the counter is counting and a non-asserted state when the counter is not counting; and
determining whether to start focusing the laser beam onto a specific layer of the optical disc based on the gate or window signal.

11. The optical disc focusing method according to claim 10, further comprising:
transmitting the outputted summed signal through a high pass filter (HPF);
processing the outputted summed signal to generate the gate or window signal; and
starting the focusing control process according to the generated gate or window signal.

12. The optical disc focusing method according to claim 11, further comprising transmitting the outputted summed signal through a low pass filter (LPF) before transmitting the outputted summed signal through the HPF.

13. The optical disc focusing method according to claim 11, wherein the gate or window signal is generated using the outputted summed signal transmitted through the HPF.

14. The optical disc focusing method according to claim 10, wherein the objective lens comprises a ring-shaped lens which focuses laser beams having different wavelengths.

15. The optical disc focusing method according to claim 14, wherein the objective lens further comprises a surface with a plurality of diffraction rings which focuses the laser beams having different wavelengths onto corresponding optical discs.

16. The optical disc focusing method according to claim 15, wherein the corresponding optical discs comprise at least two of a blue-ray disc, a high-density digital versatile disc, a digital versatile disc, and a compact disc.

17. An optical disc apparatus which prevents improper focusing, comprising:
an optical pickup which emits a laser beam to an optical disc, reads the laser beam reflected from the optical disc, divides the reflected laser beam into divided signals, and transmits the divided signals;
a signal processor which receives the divided signals and generates a focus error signal from the divided signals; and
an actuator which uses the focus error signal to focus the emitted laser beam onto a recording layer of the optical disc,
wherein the signal processor comprises:
a focusing start time detector which generates the focus error signal based on the divided signals received from the photodiode; and
a focus error signal processor which transmits the focus error signal to a focusing controller which controls focusing operations of the optical disc apparatus, and
wherein the focusing start time detector comprises:
a summation circuit which sums the divided signals;
a low pass filter (LPF) which filters out high-frequency noise from the summed signal; a gain control amplifier which controls the gain of the summed signal:
a high pass filter (HPF) which filters out low-frequency noise and parasitic Signals from the summed signal;
a comparator which outputs a digital signal having a frequency of the summed signal filtered through the HPF;
a frequency divider which divides the frequency of the digital signal;
a counter which counts the divided digital signal; and
a digital signal synchronizer which synchronizes the divided digital signal.

18. The optical disc apparatus of claim 17, wherein the optical pickup comprises:
a laser diode which emits the laser beam;
an objective lens through which the emitted laser beam travels;
a photodiode which receives at least a portion of the laser beam reflected off of the optical disc;
a beam splitter which reflects the reflected laser beam onto the photodiode; and
a front photodiode which receives a portion of the laser beam emitted by he laser diode,
wherein the photodiode divides the portion of the laser beam into the plurality of divided signals.

19. The optical disc apparatus of claim 17, wherein the controller uses the focus error signal transmitted by the focus error signal processor to begin focusing operations.

20. The optical disc apparatus of claim 17, wherein the divided signals comprise four signals, wherein each signal has a corresponding amplitude of either A, B, C, or D, and
wherein the summation circuit generates the focus error signal according to the equation:

focus error=$(A+C)-(B+D)$.

21. An optical disc apparatus, comprising:
an optical pickup which emits a laser beam through an objective lens to an optical disc, wherein the laser beam writes data onto and reads data from the optical disc, and the optical pickup reads the laser beam reflected from the optical disc and then outputs a signal based on the reflected laser beam; and
a focusing start time detector which generates a focus error signal from the signal outputted by the optical pickup, wherein the focusing start time detector detects a zero crossing point of the focus error signal using filters to filter out a parasitic signal and noise from the focus error signal, a comparator to generate a digital signal based on the filtered focus error signal, a counter to initiate a count at each rising edge of the digital signal, and a synchronization circuit to output a gate or window signal having an asserted state corresponding to the count of the counter and a non-asserted state corresponding to time when the counter is not counting.

* * * * *